(12) United States Patent
Shimokawa et al.

(10) Patent No.: US 10,788,443 B2
(45) Date of Patent: Sep. 29, 2020

(54) GAS SENSOR ELEMENT AND GAS SENSOR

(71) Applicant: DENSO CORPORATION, Kariya, Aichi-pref. (JP)

(72) Inventors: Hironobu Shimokawa, Nishio (JP); Toshihiko Harada, Nishio (JP); Kazuki Yagi, Kariya (JP)

(73) Assignee: DENSO CORPORATION, Kariya (JP)

( * ) Notice: Subject to any disclaimer, the term of this patent is extended or adjusted under 35 U.S.C. 154(b) by 164 days.

(21) Appl. No.: 15/556,090

(22) PCT Filed: Mar. 1, 2016

(86) PCT No.: PCT/JP2016/056269
§ 371 (c)(1),
(2) Date: Sep. 6, 2017

(87) PCT Pub. No.: WO2016/143610
PCT Pub. Date: Sep. 15, 2016

(65) Prior Publication Data
US 2018/0259476 A1    Sep. 13, 2018

(30) Foreign Application Priority Data
Mar. 6, 2015   (JP) ................................ 2015-044446

(51) Int. Cl.
*G01N 27/407* (2006.01)
*C04B 35/486* (2006.01)
*F01N 11/00* (2006.01)

(52) U.S. Cl.
CPC ....... *G01N 27/4071* (2013.01); *C04B 35/486* (2013.01); *F01N 11/007* (2013.01); *G01N 27/4073* (2013.01)

(58) Field of Classification Search
CPC .......................................... G01N 27/406–4118
(Continued)

(56) References Cited

U.S. PATENT DOCUMENTS

| 5,393,397 A * | 2/1995 | Fukaya .............. G01N 27/4075 204/424 |
| 6,174,489 B1 * | 1/2001 | Kobayashi ......... G01N 27/4073 264/618 |

(Continued)

FOREIGN PATENT DOCUMENTS

| JP | 05-133931 | 5/1993 |
| JP | 2011-242145 | 12/2011 |

*Primary Examiner* — Bach T Dinh
(74) *Attorney, Agent, or Firm* — Nixon & Vanderhye P.C.

(57) ABSTRACT

A gas sensor element having good sensitivity and responsiveness at low temperature, and a gas sensor are provided. The gas sensor element includes a solid electrolyte member made of an oxygen ion conductive $ZrO_2$-based ceramic, and a reference gas-side electrode and a measuring gas-side electrode respectively provided on a surface and the other surface of the solid electrolyte member. The gas sensor includes the gas sensor element. The reference gas-side electrode and the measuring gas-side electrode are formed so as to face each other with the solid electrolyte member interposed therebetween, and are both made of a noble metal or a noble metal alloy. A mixed layer with an average thickness of 800 nm or less is formed between the solid electrolyte member and the reference gas-side electrode. The mixed layer contains a noble metal or a noble metal alloy and a $ZrO_2$-based ceramic mixed with each other.

2 Claims, 13 Drawing Sheets

(58) Field of Classification Search
USPC ................. 204/421–429; 205/783.5–786
See application file for complete search history.

(56) References Cited

U.S. PATENT DOCUMENTS

| | | | | |
|---|---|---|---|---|
| 6,712,945 B2* | 3/2004 | Diehl | ................. | G01N 27/4075 |
| | | | | 204/421 |
| 2002/0011411 A1* | 1/2002 | Katafuchi | .......... | G01N 27/4075 |
| | | | | 204/427 |
| 2007/0095662 A1* | 5/2007 | Suzuki | ............... | G01N 27/4071 |
| | | | | 204/424 |
| 2015/0293051 A1 | 10/2015 | Kajiyama et al. | | |

* cited by examiner

FIG.6
(a) 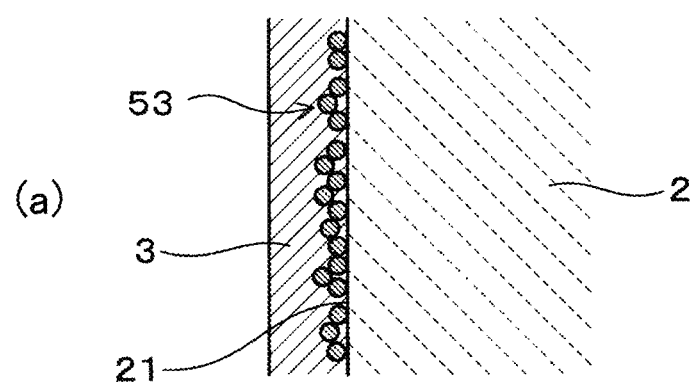
(b) 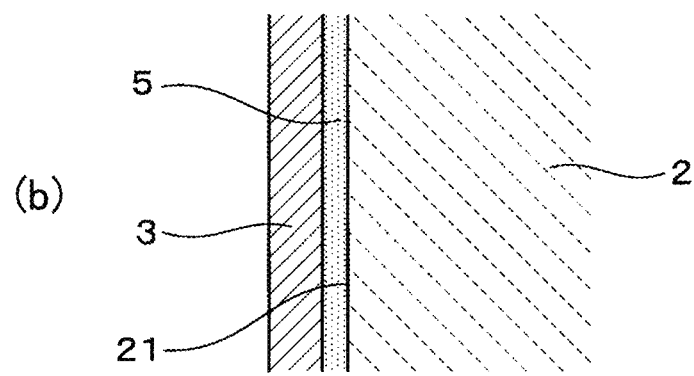

GAS SENSOR ELEMENT AND GAS SENSOR

CROSS REFERENCE TO RELATED APPLICATION

This application is the U.S. national phase of International Application No. PCT/JP2016/056269 filed Mar. 1, 2016 which designated the U.S. and claims priority to Japanese Application No. 2015-44446 filed Mar. 6, 2015, the entire contents of each of which are incorporated herein by reference.

TECHNICAL FIELD

The present invention relates to a gas sensor element including a solid electrolyte member, a reference gas-side electrode, and a measuring gas-side electrode, and to a gas sensor including the gas sensor element.

BACKGROUND ART

Internal combustion engines such as automobile engines based on conventional art are provided downstream with an exhaust gas purification system to purify exhaust gas discharged from the internal combustion engine. The exhaust gas purification system includes a three-way catalyst for purifying exhaust gas, and a gas sensor for detecting excess air ratio (λ) in the exhaust gas. The exhaust gas purification system purifies exhaust gas by feeding back, as a sensor output, the excess air ratio (λ) of the exhaust gas that has passed through the three-way catalyst to the control unit (engine control unit, ECU) of the internal combustion engine, and controlling the operating conditions of the internal combustion engine so that the three-way catalyst functions effectively.

Generally, a gas sensor includes a gas sensor element having an oxygen ion conductive solid electrolyte member, a reference gas-side electrode, and a measuring gas-side electrode, and includes a heater for heating the gas sensor element. To obtain sufficient sensor output in the gas sensor, the temperature of the gas sensor element needs to be raised to a predetermined temperature or more. To this end, the gas sensor element is heated by the heater. On the other hand, in recent years, in view of the increasing demand for fuel consumption reduction and power saving, heating of the gas sensor by the heater is required to be suppressed as much as possible. Thus, to achieve emission reduction and power saving, development of a gas sensor is desired, with which the exhaust gas composition can be reliably detected as a sensor output even at a low temperature, and can feed back the sensor output to the ECU, that is, a gas sensor that has good responsiveness at a low temperature.

For example, there has been developed an oxygen concentration detector as a gas sensor element, which includes a substrate made of a solid electrolyte having oxygen ion conductivity, a pair of cermet electrodes provided on the substrate, and platinum layers formed on the surfaces of the respective cermet electrodes by electrolytic plating (PTL 1). Such a gas sensor element can enhance the activities of the measuring gas-side electrode and the reference gas-side electrode thanks to the platinum layers formed on the surfaces of the respective cermet electrodes by electrolytic plating.

Another gas sensor with high responsiveness is disclosed in PTL 2. The gas sensor disclosed in PTL 2 includes a solid electrolyte member and a reference gas electrode, and the reference gas electrode includes an electrode surface layer and an electrode intermediate layer. To be specific, the electrode intermediate layer is provided between the solid electrolyte member and the electrode surface layer. With such a configuration, responsiveness of the gas sensor is enhanced by forming the electrode intermediate layer from a mixed material of a noble metal and zirconia.

CITATION LIST

Patent Literature

[PTL 1] JP H05-133931 A
[PTL 2] JP 2007-121173 A

SUMMARY OF THE INVENTION

However, the gas sensor element disclosed in PTL 1 does not have sufficient sensitivity and responsiveness at a low temperature, for example, of 200 to 300° C. Forming platinum layers on the surfaces of the respective cermet electrodes increases the specific surface area of platinum and thus improves the reaction rate. However, since the activity of platinum decreases at low temperature, both sensor output (sensitivity) and responsiveness decrease. The intermediate layer of the gas sensor element described in PTL 2 has a thickness of 1000 nm. An intermediate layer having such a large thickness inhibits gas diffusion and increases gas diffusion resistance, leading to decrease of sensor output and responsiveness at low temperature.

The present disclosure has been made in view of such circumstances, and an object of the present disclosure is to provide a gas sensor element having good sensitivity and responsiveness at low temperature, and to provide a gas sensor.

A gas sensor element according to an aspect of the present disclosure includes: a solid electrolyte member made of an oxygen ion conductive $ZrO_2$-based ceramic, and a reference gas-side electrode and a measuring gas-side electrode respectively provided on a surface and the other surface of the solid electrolyte member. The reference gas-side electrode and the measuring gas-side electrode are formed so as to face each other with the solid electrolyte member interposed therebetween, and are both made of a noble metal or a noble metal alloy. A mixed layer with an average thickness of 800 nm or less is formed between the solid electrolyte member and the reference gas-side electrode. In the mixed layer, a noble metal or a noble metal alloy is mixed with a $ZrO_2$-based ceramic.

Another aspect of the present disclosure resides in a gas sensor including the gas sensor element.

In the gas sensor element, the mixed layer is a part having an average thickness of 800 nm or less in which a noble metal or a noble metal alloy is mixed with the oxygen ion conductive $ZrO_2$ ceramic. The mixed layer formed between the solid electrolyte and the reference electrode (hereinafter referred to as "reference electrode" as appropriate) contributes to reducing oxygen dissociation reaction resistance. Further, since the average thickness of the mixed layer is 800 nm or less, gas diffusion resistance is prevented from increasing due to obstruction of gas diffusion, as compared with the case where the mixed layer has a large thickness of 1000 nm, for example. In particular, in a low temperature range of 200 to 300° C., for example, the output decrease due to dissociation reaction resistance in the reference electrode is more dominant than due to reaction resistance in the measuring gas-side electrode (hereinafter referred to as "measurement electrode" as appropriate). Thus, the gas sensor element can provide a high sensor output even in a low temperature range, and exhibit good sensitivity even at low temperatures. Further, the sensor output of the gas sensor element changes greatly in a short time even in a low temperature range, and therefore the gas sensor element also has good responsiveness at low temperatures.

In addition, when there is no mixed layer between the solid electrolyte member and the reference electrode, variation between products of gas sensor elements tends to become large in low-temperature sensor output. The gas sensor element with a mixed layer as described above can reduce such variation. This leads to reducing variation in low-temperature performance, such as sensitivity and responsiveness at low temperature, of the gas sensor element.

The gas sensor is provided with the gas sensor element having good sensitivity and responsiveness at low temperature as described above. Thus, the gas sensor can exhibit good sensitivity and responsiveness even at low temperature, and can contribute to fuel saving and power saving. In addition, since the gas sensor includes the gas sensor element with small variation in low-temperature performance as described above, variation in low-temperature performance can also be reduced in the gas sensor.

BRIEF DESCRIPTION OF THE DRAWINGS

FIG. 6 is a set of partial cross-sectional views according to Example 1, in which (a) shows the solid electrolyte member in which an alloyed region has been formed at the deposition part, and (b) shows the solid electrolyte member in which a mixed layer has been formed.

DESCRIPTION OF THE EMBODIMENTS

Figure 1:
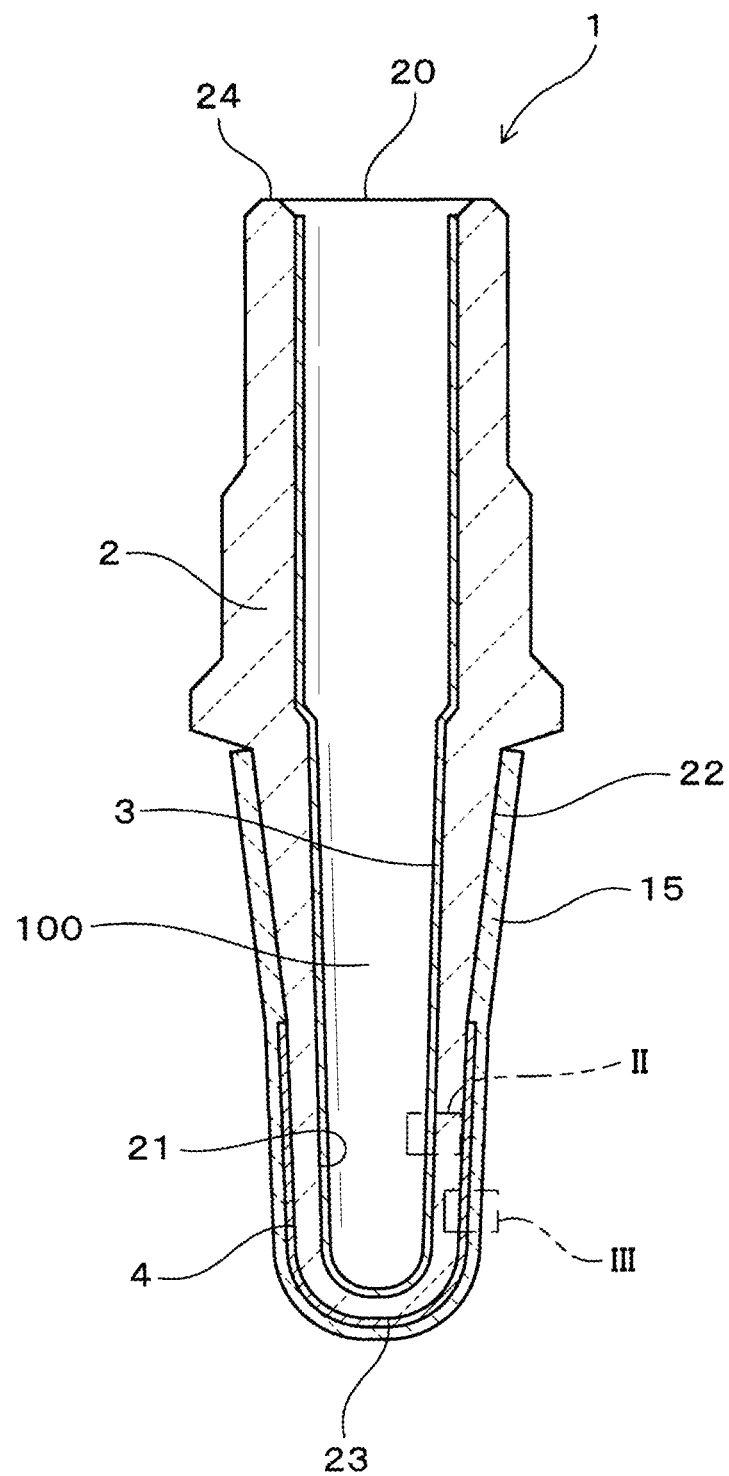
FIG. 1 is a cross-sectional view of a gas sensor element according to Example 1.

An embodiment of a gas sensor element will be described. In the present disclosure, a range expression of "value A to value B" means that the range includes the values A and B.

In the gas sensor element, the reference electrode is exposed to the reference gas, and the measurement electrode is exposed to the measuring gas. The reference gas used is, for example, a gas containing oxygen, more specifically, atmospheric air, oxygen gas or the like. Examples of the measuring gas include nitrogen oxide gas, $O_2$ gas, water vapor, hydrocarbon gas, CO gas, $H_2$ gas, and a mixture of two or more of these gases. More specifically, the measuring gas may be the exhaust gas discharged from an internal combustion engine.

The reference electrode and the measurement electrode are made of a noble metal or a noble metal alloy. Examples of the noble metal include Pt, Pd, Au, and the like. An alloy containing at least one of these noble metals can be used as the noble metal alloy.

The mixed layer may be continuously formed between the solid electrolyte and the reference electrode, or may be intermittently formed therebetween. The solid electrolyte and the mixed layer contain a $ZrO_2$-based ceramic which, for example, may be $ZrO_2$, or may be $ZrO_2$ in which a stabilizer, such as $Y_2O_3$ or CaO, is dissolved (partially stabilized zirconia). The shape of the solid electrolyte can be, for example, a cylindrical shape with a bottom (cup-like shape), a plate-like shape, or the like.

The gas sensor element is manufactured by a method including a first step of adhering a sol containing solid electrolyte particles of an oxygen ion conductive $ZrO_2$-based ceramic to a reference gas-side electrode-forming (reference electrode-forming) part of the solid electrolyte; a second step of heating the sol adhered onto the solid electrolyte to deposit the solid electrolyte particles at the reference gas-side electrode forming part to thereby form a porous deposition part; a third step of forming the reference gas-side electrode on the deposition part using a plating solution containing a noble metal and/or a noble metal alloy and depositing the noble metal and/or the noble metal alloy inside the deposition part; a fourth step of forming the measuring gas-side electrode (measurement electrode) on the solid electrolyte; a fifth step of applying a DC voltage across the reference gas-side electrode and the measuring gas-side electrode such that oxygen ions flow from the reference gas-side electrode to the measuring gas-side electrode to form, at the deposition part, an alloyed region of an alloy containing at least a noble metal and Zr; and a sixth step of forming the mixed layer by oxidizing the alloyed region.

In the first step, as described above, a sol containing solid electrolyte particles is adhered to the reference electrode-forming part of the solid electrolyte member, and in the second step, the sol adhered to the forming part is heated. As a result, a number of solid electrolyte particles agglomerate and join to each other, thereby forming a porous deposition part having asperities. In the third step, a reference electrode made of a noble metal and/or a noble metal alloy is formed on the deposition part using a plating solution. In this case, since the plating solution is impregnated into the porous deposition part, the noble metal and/or the noble metal alloy is also deposited inside the deposition part when the reference electrode is formed. Examples of electrode formation using a plating solution include electrolytic plating, electroless plating, and the like.

In the fourth step, a measurement electrode is formed on the solid electrolyte. The measurement electrode can be formed by a known electrode forming method, other than the above-mentioned electrolytic plating and electroless plating. In the fifth step, a DC voltage is applied across the electrodes so that oxygen ions flow from the reference electrode to the measurement electrode. As a result of the reduction reaction caused by the voltage application, Zr in the $ZrO_2$-based ceramic constituting the deposition part and the noble metal are alloyed, to form an alloyed region of an alloy containing at least a noble metal and Zr. For example, the voltage application in the fifth step may be carried out at 2.0 V to 3.0 V for 5 seconds to 30 minutes. For example, voltage can be applied under a temperature condition of 600° C. to 800° C. in atmospheric air, or an inert gas atmosphere. In the sixth step, the alloyed region is oxidized by heating it in an oxidizing atmosphere, such as atmospheric air. As a result, in the alloyed region, the $ZrO_2$-based ceramic is finely separated from the noble metal and/or the noble metal alloy, and a mixed layer in which they are mixed is formed.

In such a way, a gas sensor element is manufactured, including a mixed layer in between the solid electrolyte and the reference electrode, in which a $ZrO_2$-based ceramic is finely mixed with a noble metal and/or a noble metal alloy. In such a mixed layer, the three-phase interface of the oxygen ion conductive $ZrO_2$ ceramic, the noble metal or noble metal alloy, and the exhaust gas increases. As a result, the number of reaction sites increases, and therefore the dissociation reaction resistance of oxygen at the reference electrode can be sufficiently reduced. Thus, a gas sensor element with good sensitivity and responsiveness can be manufactured. In addition, gas sensor elements having small variation between products in low-temperature performance can be manufactured, and gas sensor elements with good low-temperature performance can be stably manufactured.

The solid electrolyte particles in the sol used in the first step are preferably, for example, fine particles with an average particle diameter of 20 nm to 80 nm. In this case, a mixed layer can be formed, in which a noble metal or a noble metal alloy and a Zr-based ceramic are more finely mixed at the nano level. As a result, the number of reaction sites can be increased more, and therefore the dissociation reaction resistance of oxygen at the reference electrode can be further reduced. The average particle diameter of the solid electrolyte particles refers to the particle diameter in terms of a cumulative value of 50% in the particle size distribution obtained by the laser diffraction/scattering analysis.

The gas sensor will be described.

The gas sensor includes at least a gas sensor element. To be specific, the gas sensor includes, for example, a gas sensor element and a heater for heating and activating the gas sensor element.

For example, the gas sensor is installed in an exhaust system or the like of an internal combustion engine such as an automobile engine and suitably used for detecting exhaust gas. To be specific, for example, the gas sensor is suitable for an exhaust gas purification system including a catalyst, such as a three-way catalyst, for purifying the exhaust gas discharged from an internal combustion engine or the like. In this case, the gas sensor is installed downstream of the catalyst to output a signal based on the excess air ratio of the exhaust gas.

EXAMPLES

Example 1

With reference to the drawings, a gas sensor element according to an example will be described.

Figure 2:
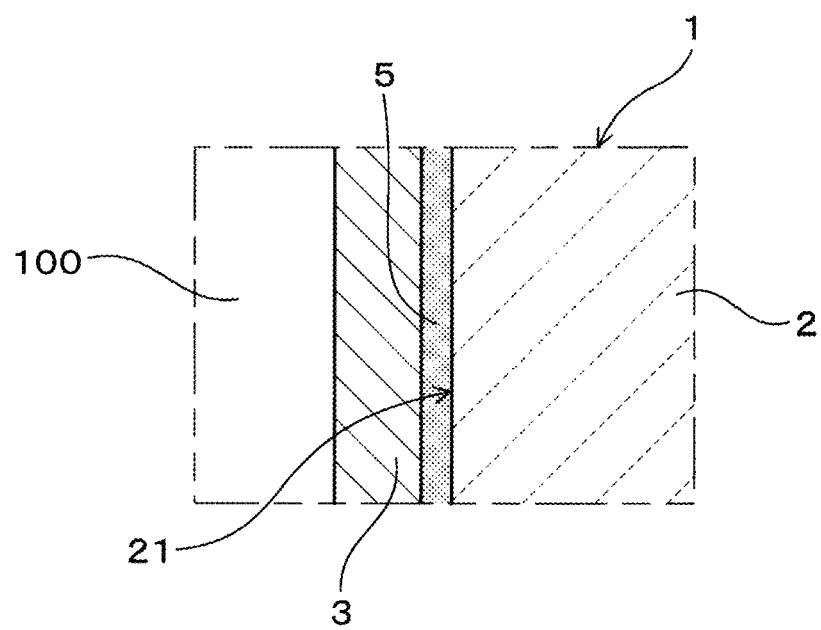
FIG. 2 is an enlarged view of region II in FIG. 1.
Figure 3:
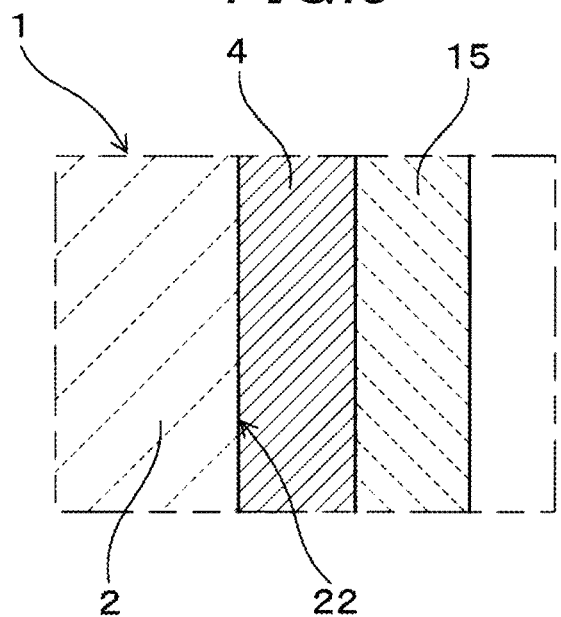
FIG. 3 is an enlarged view of region III in FIG. 1.

As shown in FIG. 1, a gas sensor element 1 of the present example includes a solid electrolyte member 2 made of an oxygen ion conductive $ZrO_2$-based ceramic, and a reference gas-side electrode (referred to as a reference electrode) 3 and a measuring gas-side electrode (referred to as a measurement electrode) 4 provided on the respective surfaces 21 and 22 of the solid electrolyte member 2. The reference electrode 3 and the measurement electrode 4 are made of a noble metal. As shown in FIG. 2, between the solid electrolyte member 2 and the reference electrode 3, a mixed layer 5 having an average thickness of 800 nm or less is formed, with the noble metal and the oxygen ion conductive $ZrO_2$ ceramic being mixed therein. However, as shown in FIG. 3, no mixed layer is formed between the solid electrolyte member 2 and the measurement electrode 4. In other words, the solid electrolyte member 2 and the measurement electrode 4 are directly in contact with each other. This will be described in detail below.

As shown in FIG. 1, in the gas sensor element 1, the solid electrolyte member 2 has a bottomed cylindrical shape (cup shape), and the inside thereof is a reference gas chamber 100 into which a reference gas (e.g., atmospheric air) is introduced. The solid electrolyte member 2 is made of yttria-stabilized zirconia (YSZ) and may have a thickness, for example, in the range of 0.1 to 3 mm.

On the inner surface 21 of the cup-shaped solid electrolyte member 2, the reference electrode 3 made of Pt is formed, being exposed to atmospheric air which is the reference gas. The reference electrode 3 is formed over the entire inner surface 21 of the solid electrolyte member 2. On the outer surface 22 of the solid electrolyte member 2, the measurement electrode 4 made of Pt is formed, being exposed to the exhaust gas which is the measuring gas. The measurement electrode 4 is formed over an area of the outer surface 22 of the solid electrolyte member 2, extending over a predetermined length from a tip 23 of the solid electrolyte member 2. The reference electrode 3 and the measurement electrode 4 are formed on the opposite sides of the solid electrolyte member 2, so as to face each other with the solid electrolyte member 2 interposed therebetween. The measuring electrode 4 has a lead electrode extending toward a rear end 24 of the solid electrolyte member 2, and at the rear end of the lead electrode, a terminal electrode is electrically connected.

The lead electrode and the terminal electrode are not shown in FIG. 1 because they are formed at positions not appearing in the cross section of FIG. 1. The measurement electrode 4 is covered with a porous protective layer 15. The main component of this protective layer 15 is $MgAl_2O_4$ which is a spinel oxide, and it serves to trap harmful components in the exhaust gas which is the measuring gas.

FIG. 2 is an enlarged cross-sectional view of the gas sensor element 1 showing a part between the solid electrolyte member 2 and the reference electrode 3. As shown in FIG. 2, between the solid electrolyte member 2 and the reference electrode 3, the mixed layer 5 is formed, in which the noble metal is mixed with the oxygen ion conductive $ZrO_2$-based ceramic. Similarly to the electrodes 3 and 4, the mixed layer 5 contains Pt as a noble metal and zirconia as the $ZrO_2$-based ceramic, and may at least partially contain yttrium. The mixed layer 5 contains fine noble metal particles (Pt particles in the present example), being finely mixed with fine solid electrolyte particles (zirconia-based ceramic particles in the present example). The ratio of fine noble metal particles (Pt particles in the present example) and fine solid electrolyte particles (zirconia-based ceramic particles in the present example) in the mixed layer 5 is 5:5 in terms of the molar ratio of Pt and Zr. It should be noted that the ratio of fine noble metal particles (Pt particles in the present example) and fine solid electrolyte particles (zirconia-based ceramic particles in the present example) is not limited to 5:5, and can be changed as appropriate. The ratio of the noble metal particles and the solid electrolyte particles in the mixed layer 5 can be adjusted so that the molar ratio of the noble metal and zirconium (Zr) falls within a range of 3:7 to 7:3 (noble metal:Zr). Preferably, the molar ratio of noble metal to zirconium in the mixed layer 5 is in the range of 4:6 to 6:4 (noble metal:Zr).

FIG. 3 is an enlarged cross-sectional view of the gas sensor element 1 showing a part between the solid electrolyte member 2 and the measurement electrode 4. As shown in FIG. 3, no mixed layer as described above is formed between the solid electrolyte member 2 and the measurement electrode 4, and the measurement electrode 4 is directly layered over the surface 22 of the solid electrolyte member 2.

A method of manufacturing the gas sensor element 1 of the present example will be described.

Figure 4:
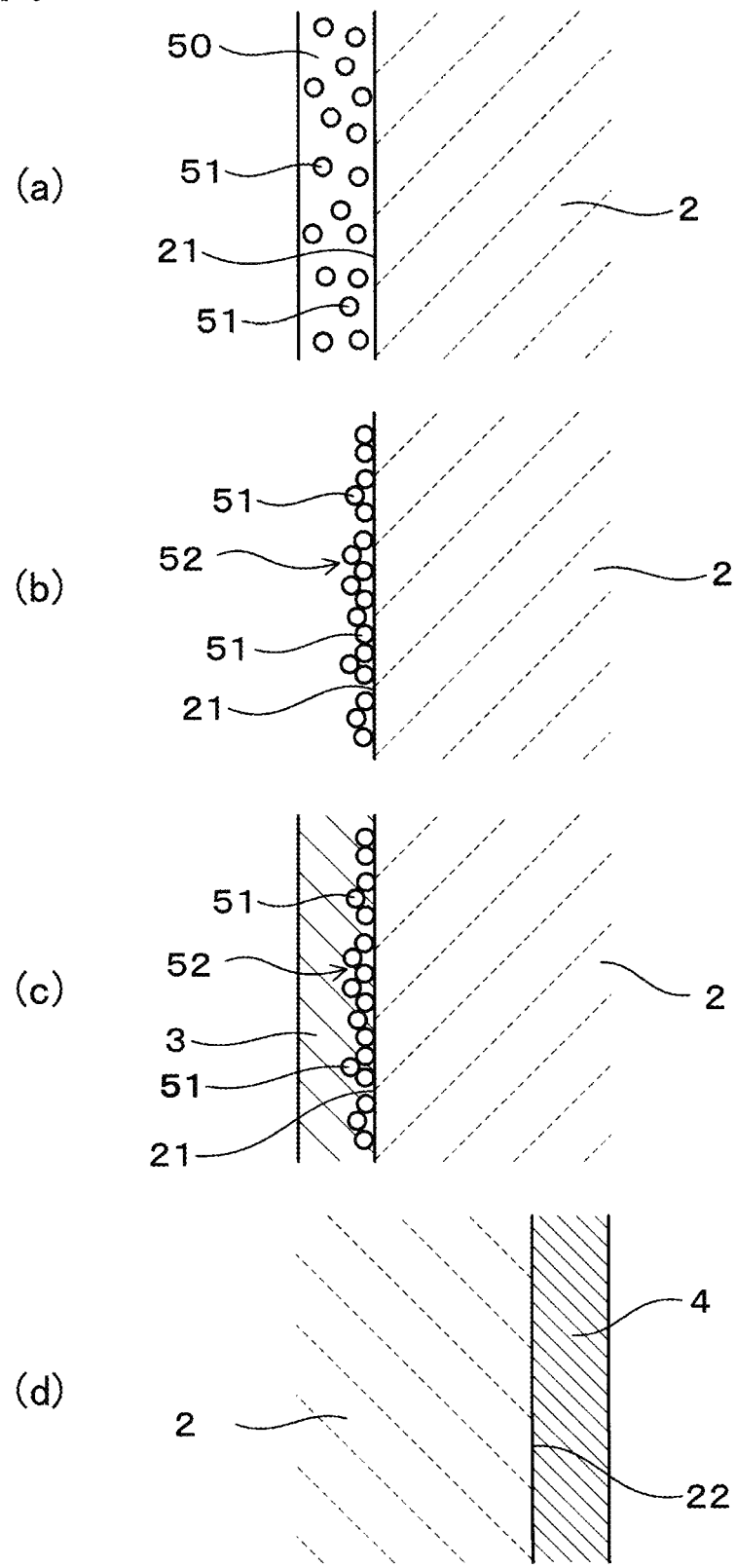
FIG. 4 is a set of partial cross-sectional views according to Example 1, in which (a) shows a solid electrolyte member to which a sol is adhered to a reference electrode-forming part, (b) shows the solid electrolyte member in which a deposition part is formed at the reference electrode-forming part, (c) shows the solid electrolyte member in which a reference electrode has been formed at the deposition part, and (d) shows the solid electrolyte member in which a measurement electrode has been formed.

First, a cup-shaped solid electrolyte member 2 made of YSZ was prepared (see FIG. 1). A sol (solid content: 20 to 40 mass %, pH: 3 to 10, average particle diameter: 5 to 70 nm) containing fine solid electrolyte particles of $ZrO_2$ was dropped and filled in the inner space of the cup-shaped solid electrolyte member 2. Then, excessive sol was removed from the inside of the solid electrolyte member 2, with an opening 20 of the solid electrolyte member 2 being turned vertically downward. In this way, as shown in FIG. 4(a), a sol 50 containing solid electrolyte particles 51 was adhered to the reference electrode-forming part 21 of the solid electrolyte member 2 (first step). In the present example, since the reference electrode 3 is formed on the entire inner surface 21 of the solid electrolyte member 2, the inner surface and the reference electrode-forming part are expressed using the same reference sign 21 as already done above.

Then, the solid electrolyte member 2 to which the sol 50 was adhered was heated in atmospheric air at 1000° C. for 1 hour. As a result, as shown in FIG. 4(b), the solid electrolyte particles 51 were deposited at the reference electrode-forming part 21, and a deposition part 52 in which many solid electrolyte particles 51 were agglomerated and joined to each other was formed (second step). In the present example, a porous deposition part 52 with a thickness of about 200 nm was formed by repeating the above-described adhesion of the sol 50 (see FIG. 4(a)) and deposition of the solid electrolyte particles 51 by heating (see FIG. 4(b)).

Then, as shown in FIG. 4(c), the reference electrode 3 made of a noble metal was formed over the deposition part 52 using a plating solution (third step). To be specific, the deposition part 52 was impregnated with an active liquid containing dibenzylidene Pt (Pt content was 0.0002 mass % in the present example), followed by heating, to form a Pt nucleation part. Then, electroless plating was performed at 50° C. using a plating solution containing a Pt complex, thereby forming a reference electrode 3 made of Pt with a thickness of 1.0 μm. Since the plating solution also permeated the porous deposition part 52, Pt was also deposited inside the deposition part 52 (see FIG. 4(c)).

Then, an active paste containing dibenzylidene Pt (Pt content was 0.0002 mass % in the present example) was applied to the outer surface 22 of the solid electrolyte member 2 by pad printing to form a printed part (i.e., Pt nucleation part). Then, the printed part was heated at 40° C., followed by electroless plating at 50° C. using a plating solution containing a Pt complex. Thus, as shown in FIG. 4(d), the measurement electrode 4, the lead part (not shown), and the terminal electrode (not shown) were formed on the outer surface 22 of the solid electrolyte member 2 (fourth step). The thickness of these electrodes and lead part was 1.0 μm.

Figure 5:
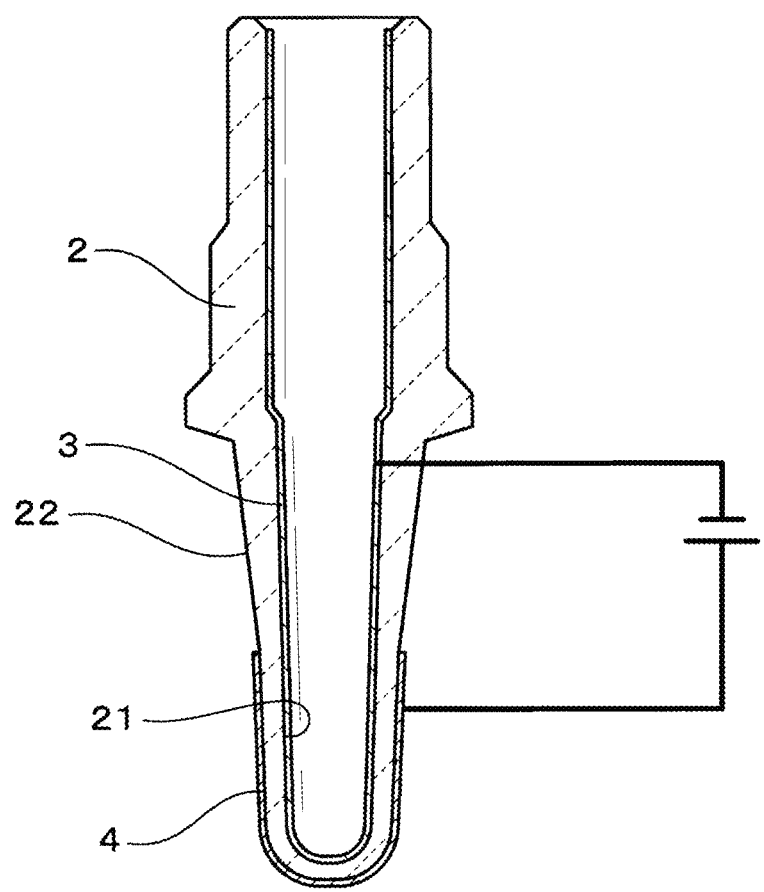
FIG. 5 is a cross-sectional view of the solid electrolyte member, showing voltage application across the reference electrode and the measurement electrode, according to Example 1.

Then, a DC voltage was applied to the solid electrolyte member 2 on which the deposition part 52, the reference electrode 3, and the measurement electrode 4 were formed as described above. To be specific, as shown in FIG. 5, a DC voltage was applied across the reference electrode 3 and the measurement electrode 4 so that oxygen ions (i.e., $O^{2-}$ ions) flowed from the reference electrode 3 to the measurement electrode 4 (fifth step). More specifically, while heating the solid electrolyte member 2 having the reference electrode 3 and the measurement electrode 4 at 800° C. in a nitrogen atmosphere, a DC voltage of 2.5 V was applied for 30 seconds across the reference electrode 3 and the measurement electrode. As shown in FIG. 5, the voltage was applied by connecting the reference electrode 3 to the negative electrode and connecting the measurement electrode 4 to the positive electrode. As a result, $O^{2-}$ ions moved from the reference electrode 3 side toward the measurement electrode 4 side. In doing so, $O^{2-}$ ions were extracted from the $ZrO_2$-based ceramic (zirconia in the present example) in the deposition part 52 near the reference electrode 3 to reduce it to Zr, to thereby form an alloy (Pt—Zr-based alloy in the present example) with the noble metal (Pt in the present example) present nearby (see FIG. 4 (c)). As a result, as shown in FIG. 6(a), an alloyed region 53 containing at least Pt and Zr and having a thickness of about 200 nm was formed at the deposition part. Although not shown, it is considered that the voltage application also partially reduced the $ZrO_2$-based ceramic in the solid electrolyte member 2 to Zr to form an alloy with Pt, near the surface of the solid electrolyte member 2 on the forming part 21 side of the reference electrode 3.

Then, the alloyed region 53 was heated in an oxidizing atmosphere, for oxidization (sixth step). To be specific, the alloyed region 53 was heated at 950° C. for 30 minutes in atmospheric air. Thus, Zr was oxidized in the alloyed region 53 to produce a $ZrO_2$-based ceramic, and at the same time the $ZrO_2$-based ceramic was finely separated from the noble metal (Pt in the present example). As a result, as shown in FIG. 6(b), a mixed layer 5 in which the $ZrO_2$-based ceramic and the noble metal (Pt in the present example) were finely mixed was formed. In this way, the mixed layer 5 having a thickness of about 200 nm was formed between the solid electrolyte member 2 and the reference electrode 3. As mentioned above, an alloy including Pt and Zr might also have been formed near the surface of the solid electrolyte member 2 on the forming part 21 side of the reference electrode 3. In this case, it is considered that this alloy was oxidized as well by the heating in atmospheric air and formed a part of the mixed layer 5.

Then, a protective layer 15 covering the measurement electrode 4 was formed by a known method on the solid electrolyte member 2 which had been formed with the mixed layer 5, the reference electrode 3, the measurement electrode 4, and the like as described above (see FIG. 1). Thus, the gas sensor element 1 of the present example was obtained.

Figure 7:
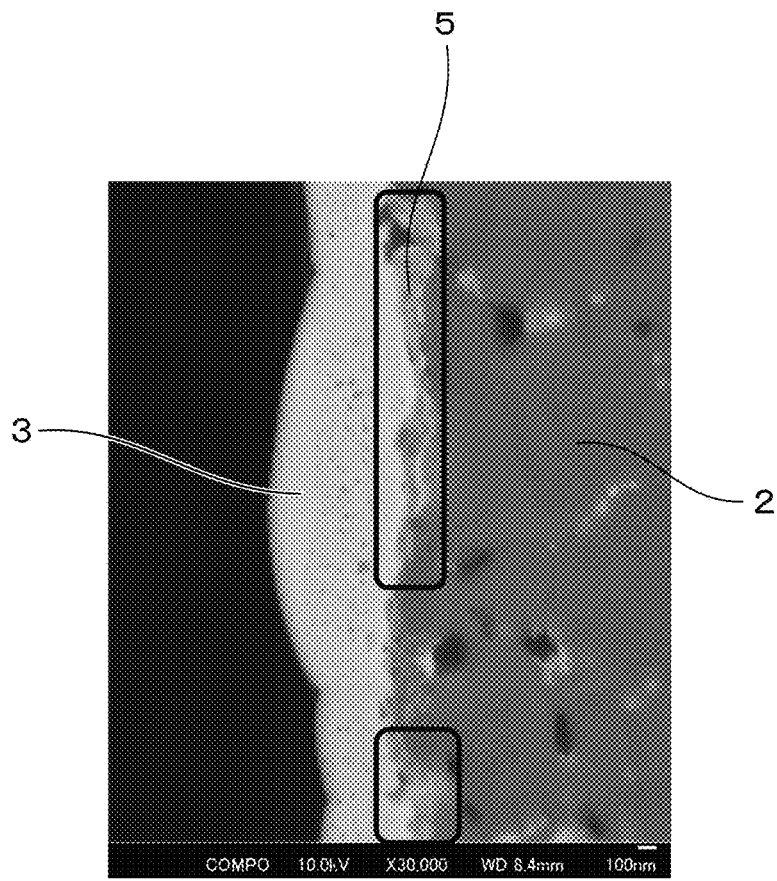
FIG. 7 shows a SEM photograph (backscattered electron image) of an area around the mixed layer of the gas sensor element, according to Example 1.

Then, the cross section of the gas sensor element 1 of the present example was observed with a scanning electron microscope to check the state of the mixed layer 5. First, the gas sensor element 1 was cut at the observation position using a rotary cutting tool. Then, using a cross section polisher, the cross section of the gas sensor element 1 was irradiated with an Ar ion beam to form a smooth observation surface. Using a scanning electron microscope (SEM) (JSM-6700F manufactured by JEOL Ltd.), the observation surface was observed with a backscattered electron detector. The results are shown in FIG. 7. In FIG. 7, to clearly show the part where the mixed layer 5 is formed, the part where the mixed layer 5 is formed is enclosed by a bold line. The conditions of the SEM observation were as follows. Observation magnification: 30000 times, acceleration voltage: 10 kV, working distance (WD): 8.4 mm. The conditions can be appropriately changed within an observation magnification range of 10000 to 200000 times, an acceleration voltage range of 5 kV to 20 kV, and a working distance range of 10 mm or less.

As shown in FIG. 7, in the gas sensor element 1 of the present example, the mixed layer 5 is formed between the solid electrolyte member 2 and the reference electrode 3. The mixed layer 5 has been actively formed by performing the first to sixth steps described above. As shown in FIG. 7, in the SEM photo (i.e., backscattered electron image), the solid electrolyte member 2 made of the $ZrO_2$-based ceramic is observed as a dark gray part close to black, the reference electrode 3 made of Pt is observed as a light gray part close to white, and the mixed layer 5 in which the $ZrO_2$-based ceramic and Pt are mixed is observed as a part with a color intermediate between the colors of the solid electrolyte member 2 and the reference electrode 3. In the mixed layer 5, the $ZrO_2$-based ceramic and Pt become so fine particles of the nano level and are uniformly mixed that they cannot be discriminated by SEM. Thus, the entirety of the mixed layer 5 is observed as an intermediate color as mentioned above.

The average thickness of the mixed layer 5 can be measured from the above SEM observation photograph (see FIG. 7). To be specific, the average thickness may be obtained by measuring the thickness of the mixed layer 5 in the lamination direction X of the solid electrolyte member 2 and the reference electrode 3 at ten arbitrary positions and averaging the measured thicknesses. The ten measurement positions should not be concentrated on a small thickness part or a large thickness part, but parts with various thicknesses should be selected for measurements. As a result, the thickness of the mixed layer 5 in the gas sensor element 1 of the present example was 200 nm. The thickness of the mixed layer 5 is equivalent to the thickness of the deposition part 52 formed in the first and second steps described above. Thus, the thickness of the mixed layer 5 can be controlled by adjusting the thickness of the deposition part 52. The thickness of the deposition part 52 can be controlled by adjusting, for example, the number of times sol is adhered to the reference electrode-forming part in the first step and the number of times solid electrolyte particles are deposited in the second step, and by adjusting the average particle diameter of the solid electrolyte particles in the sol, the content of solid electrolyte particles in the sol, and the like.

The advantageous effects of the gas sensor element 1 of the present example will be described.

As shown in FIGS. 1, 2, and 7, in the gas sensor element 1 of the present example, the mixed layer 5 has an average thickness of 200 nm, containing the noble metal mixed with the oxygen ion conductive $ZrO_2$-based ceramic. Thanks to the mixed layer 5 formed between the solid electrolyte member 2 and the reference electrode 3, the dissociation reaction resistance of oxygen in the reference electrode 3 can be reduced. In a low temperature range of, for example, 200 to 300° C., in particular, the output reduction due to the dissociation reaction resistance in the reference electrode 3 is more dominant than due to the reaction resistance in the measurement electrode 4. Thus, the gas sensor element 1 having the mixed layer 5 for reducing the dissociation reaction resistance between the solid electrolyte member 2 and the reference electrode 3 can provide a high sensor output even in the low temperature range, and exhibit good sensitivity even at low temperatures. Further, the sensor output of the gas sensor element 1 changes greatly in a short time even in the low temperature range, and therefore the gas sensor element 1 also exhibits good responsiveness at low temperatures.

On the other hand, as shown in FIG. 3, no mixed layer is formed between the solid electrolyte member 2 and the measurement electrode 4. Thus, when detecting a specific gas in the exhaust gas with the measurement electrode 4, the amount of rich gas adsorbed in the low temperature range is prevented from increasing more than necessary. Accordingly, the gas sensor element 1 is particularly improved in responsiveness to rich gas at low temperatures.

Gas sensor elements without having mixed layers as described above tend to have large variation between products in low-temperature sensor output. This variation is small in the gas sensor element 1 having the mixed layer 5 as in the present example. Thus, variation in low-temperature performance, such as sensitivity and responsiveness, can be reduced in the gas sensor element 1.

In the method of manufacturing the gas sensor element 1 of the present example, the mixed layer 5 is formed by performing the first to sixth steps described above. Thus, as described above, the solid electrolyte ($ZrO_2$-based ceramic in the present example) and the noble metal (Pt in the present example) in the form of fine particles are uniformly mixed in the mixed layer 5. That is, in the mixed layer 5 that has been formed, both of the fine particles are finely mixed at the nano level. Thus, the number of reaction sites increases in the reference electrode 3, and therefore the dissociation reaction resistance of oxygen in the reference electrode 3 is sufficiently reduced. As a result, very high sensitivity and responsiveness are achieved at low temperature in the gas sensor element 1. Further, as shown in the SEM photograph of FIG. 7, it is considered that the mixed layer 5 is formed extending from the interface between the reference electrode 3 and the solid electrolyte member 2 into the solid electrolyte member 2 (or, extending from the inner surface 21 of the solid electrolyte member that is the reference electrode-forming part into the solid electrolyte member 2). It is considered that this is because, upon application of the DC voltage in the fifth step, the solid electrolyte member 2 near the surface 21 is also partially reduced to Zr to form an alloy (Pt—Zr-based alloy in the present example) with Pt, and in the sixth step, this alloy is oxidized to form part of the mixed layer 5 in which the noble metal and the $ZrO_2$-based ceramic are mixed.

An example of a gas sensor (oxygen sensor in the present example) provided with the gas sensor element will be described.

Figure 8:
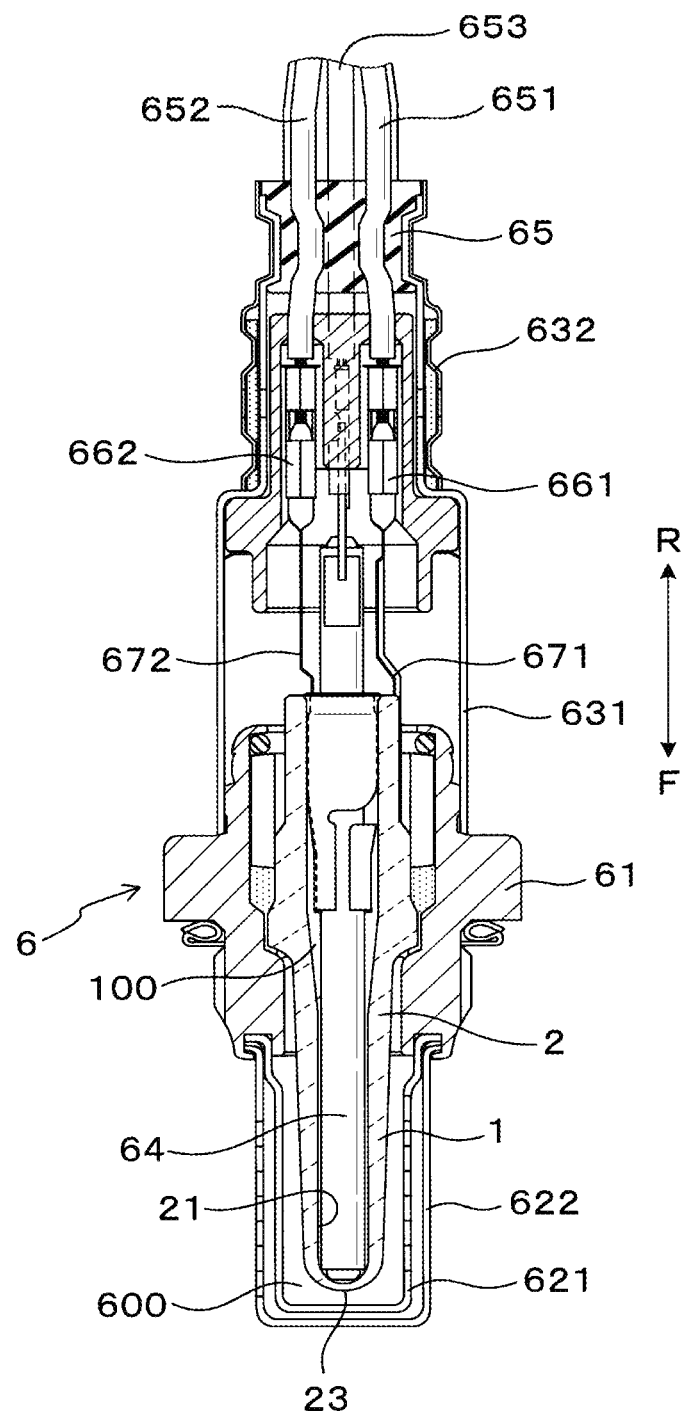
FIG. 8 is an illustration of a cross section of a gas sensor according to Example 1.

As shown in FIG. 8, a gas sensor 6 includes a housing 61 and the gas sensor element 1 inserted in the housing 61. The housing 61 is provided, on its tip side F, with measuring gas-side double covers 621, 622 for protecting the tip 23 of the gas sensor element 1, with the interior thereof serving as a measuring gas chamber 600. The housing 61 is provided, on its base end side R, with atmosphere-side double covers 631, 632.

As shown in the figure, a rod-shaped ceramic heater 64 is inserted and disposed in the reference gas chamber 100 of the gas sensor element 1. A desired clearance is secured between the side surface of the heater 64 and the inner surface 21 of the solid electrolyte member 2, and the tip of the heater 64 is in contact with the inner surface 21 of the solid electrolyte member 2. The atmosphere side covers 631, 632 are provided, on the base end side R thereof, with an elastic insulating member 65 through which lead wires 651, 652, 653 are inserted. A voltage is applied to the gas sensor element 1 through the lead wires 651, 652, and the sensor output of the gas sensor element 1 is extracted therethrough. Further, the lead wire 653 energizes the heater 64 to cause the heater to generate heat.

As shown in the figure, the lead wires 651, 652 are provided on the tip side F thereof, with respective connection terminals 661, 662. The connection terminals 661, 662 establish electrical conduction with respective terminals 671, 672 fixed to the gas sensor element 1. The terminal 671 is in contact with and fixed to a terminal electrode that is electrically connected to the measurement electrode 4 of the gas sensor element 1 (see FIGS. 1 and 8). The terminal 672 is in contact with and fixed to the reference electrode 3 of the gas sensor element 1.

The gas sensor 6 of the present example is provided with the gas sensor element 1 described above having good sensitivity and responsiveness at low temperature as described above. Thus, the gas sensor 6 can exhibit good sensitivity and responsiveness even at low temperature, and can contribute to fuel saving and power saving. In addition, since the gas sensor 6 includes the gas sensor element 1 causing only small variation in low-temperature performance as described above, variation in low-temperature performance of the gas sensor 6 is reduced.

Comparative Example 1

The present example deals with a gas sensor element not provided with a mixed layer.

As shown in FIG. 9(a), in a gas sensor element 8 of the present example, no mixed layer is provided between the solid electrolyte member 2 and the reference electrode 3. Except for this, the configuration is the same as in Example 1, and as shown in FIG. 9(b), no mixed layer is provided between the solid electrolyte member 2 and the measurement electrode 4, either. FIG. 9(a) is an enlarged cross-sectional view corresponding to FIG. 2 of Example 1 described above, and FIG. 9(b) is an enlarged cross-sectional view corresponding to FIG. 3 of Example 1. The gas sensor element 8 was prepared in the same way as in Example 1 except that a mixed layer was not formed, and an active liquid containing dibenzylidene Pt (Pt content was 0.0002 mass % in the present example) was directly applied to the inner surface of the solid electrolyte member (reference electrode-forming position in the present example) using a dispenser, followed by electroless plating. Unless otherwise indicated, components described in Example 1 are identified by like reference signs in the present Comparative Example 1, and in the following Comparative Example 2, Example 2 and Experimental Examples 1 to 4, and the description of the components in Example 1 should be referred to.

Experimental Example 1

The present example checks the relationship of temperature with sensor output, for the gas sensor elements of Example 1 and Comparative Example 1 described above.

First, gas sensors 6 with a configuration similar to that of Example 1 were prepared respectively using the gas sensor elements 1 and 8 of Example 1 and Comparative Example 1 (see FIG. 8). Then, the surface temperature of each of the gas sensor elements 1 and 8 was arbitrarily controlled within the range of 200 to 450° C. by the heater 64 installed in the gas sensor 6. After the temperature became stable, $N_2$ gas (flow rate: 3000 cc/min) and CO gas (flow rate: 60 cc/min) were fed to each gas sensor 6 for 100 seconds until the sensor output became stable. The temperature of the feed gas was 250° C. Then, the sensor output was measured at various temperature levels. The results are shown in FIG. 10.

Figure 10:
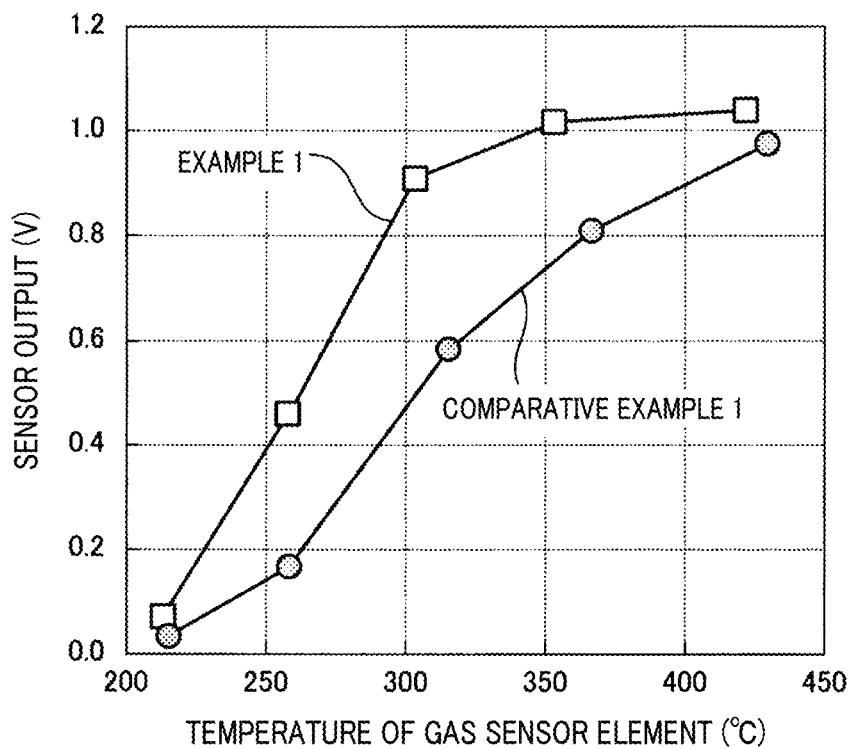
FIG. 10 is a diagram showing relationships between temperature and sensor output of the gas sensor elements of Example 1 and Comparative Example 1, according to Experimental Example 1.

As can be seen from FIG. 10, the gas sensor element 1 of Example 1 having the mixed layer 5 between the solid electrolyte member 2 and the reference electrode 3 shows a higher sensor output in the low temperature range as compared with the gas sensor element 8 of Comparative Example 1 having no mixed layer. For example, the gas sensor element 1 of Example 1 shows a high sensor output exceeding 0.9 V even at a low temperature around 300° C. and thus is well capable of detecting the measuring gas even at low temperature. Thus, it is understood that the mixed layer 5, in which the solid electrolyte is mixed with the noble metal, formed between the solid electrolyte member 2 and the reference electrode 3, as in the gas sensor element 1 of Example 1, allows the sensor output to improve at low temperature, and allows the gas sensor to exhibit good sensitivity even at low temperature.

Experimental Example 2

The present example checks the relationship of sensor output with average thickness of the mixed layer formed between the solid electrolyte member and the reference electrode.

Figure 11:
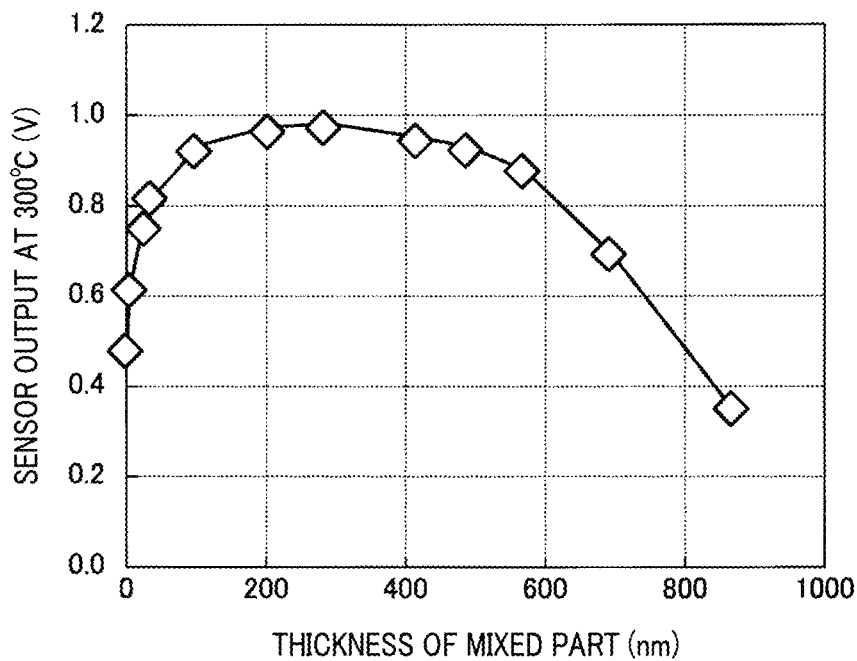
FIG. 11 is a diagram showing a relationship between thickness of a mixed layer and sensor output at 300° C. according to Experimental Example 2.

To be specific, first, a plurality of gas sensor elements 1 with different average thicknesses were prepared in the same way as in Example 1 (see FIGS. 1 and 2). The gas sensor elements 1 were each provided with a mixed layer 5 between the solid electrolyte member 2 and the reference electrode 3. The average thickness of the mixed layer 5 can be changed as appropriate when forming the deposition part, by adjusting the average diameter of the solid electrolyte particles in the sol, the content of the solid electrolyte particles in the sol, the number of times of application of the sol, the number of times of deposition of the solid electrolyte particles, and the like (see Example 1). The sensor output at 300° C. was measured for each of the gas sensor elements 1 having the mixed layers 5 with different average thicknesses. Specifically, the respective gas sensors 6 were prepared in the same way as in Example 1 using the gas sensor elements 1, and the surface temperature of the gas sensor elements 1 were adjusted to 300° C. by the heaters 64 installed in the respective gas sensors 6 (see FIG. 8). After the temperature became stable, $N_2$ gas (flow rate: 3000 cc/min) and CO gas (flow rate: 60 cc/min) were fed to each gas sensor 6 for 100 seconds until the sensor output became stable, and the stabilized sensor output was measured. The temperature of the feed gas was 250° C. The results are shown in FIG. 11. FIG. 11 also shows the results of the gas sensor element whose average thickness of the mixed layer 5 was 0, that is, one that did not have a mixed layer.

As shown in FIG. 11, when the average thickness of the mixed layer 5 formed between the solid electrolyte member 2 and the reference electrode 3 is 800 nm or less, the sensor output at a low temperature of 300° C. is improved as compared with the case where no mixed layer is formed (see FIG. 2). Specifically, when the mixed layer 5 is not provided, the sensor output is 0.48 V. When the thickness of the mixed layer 5 is 5 nm, the sensor output is 0.61 V. Similarly, thickness 24 nm results in 0.75 V, thickness 35 nm results in 0.81 V, thickness 98 nm results in 0.92 V, thickness 201 nm results in 0.96 V, thickness 285 nm results in 0.97 V, thickness 415 nm results in 0.94 V, thickness 487 nm results in 0.92 V, thickness 569 nm results in 0.87 V, thickness 692 nm results in 0.69 V, and thickness 870 nm results in 0.35 V. Thus, to obtain the effect of forming the mixed layer 5, the average thickness of the mixed layer 5 is preferably 800 nm or less. In order to further improve the low-temperature sensor output to further enhance sensitivity at low temperature, the average thickness of the mixed layer is more preferably 5 to 700 nm, and even more preferably 10 to 600 nm (see FIG. 11). As compared to the case of a mixed layer 5 with a small thickness of 5 nm, for example, a mixed layer 5 with a thickness of 200 nm, for example, can sufficiently reduce the oxygen dissociation reaction resistance, and thus exerts high sensor output and responsiveness at low temperature. On the other hand, when the average thickness of the mixed layer 5 exceeds 800 nm, gas diffusion resistance due to gas diffusion obstruction increases, as compared with the case of a mixed layer 5 with a thickness of 800 nm or less. Thus, the sensor output at a low temperature of 300° C. decreases. Accordingly, as shown in FIG. 11, at a low temperature of 300° C., the average thickness of the mixed layer 5 is desirably 800 nm or less.

Experimental Example 3

The present example checks variation in sensor characteristics, for the gas sensor elements of Example 1 and Comparative Example 1.

First, gas sensors 6 with a configuration similar to that of Example 1 were prepared using the respective gas sensor elements 1 and 8 of Example 1 and Comparative Example 1 (see FIG. 8). Then, the surface temperature of each gas sensor element was controlled to 300° C. with the heater 64 installed in the gas sensor 6. After the temperature became stable, $N_2$ gas (flow rate: 3000 cc/min) and CO gas (flow rate: 60 cc/min) were fed to each gas sensor 6 for 100 seconds until the sensor output became stable, and the stabilized sensor output was measured. The temperature of the feed gas was 250° C. Sensor output was measured for six gas sensor elements of each of Example 1 and Comparative Example 1 which were prepared in the respective ways, and variation in sensor output was compared. The results are shown in FIG. 12.

Figure 9:
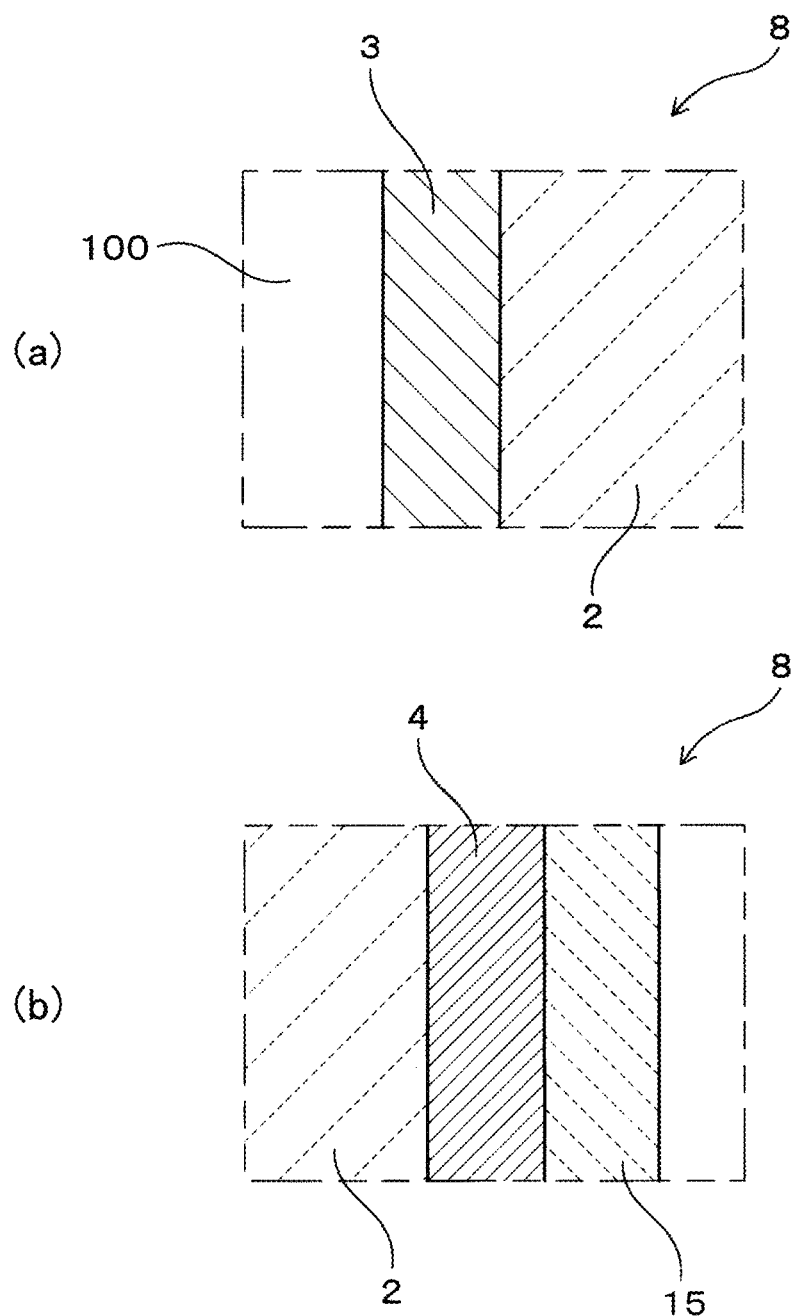
FIG. 9 is a set of enlarged cross-sectional views of a gas sensor element according to Comparative Example 1, in which (a) shows the boundary between a solid electrolyte member and a reference electrode, and (b) shows the boundary between the solid electrolyte member and a measurement electrode.
Figure 12:
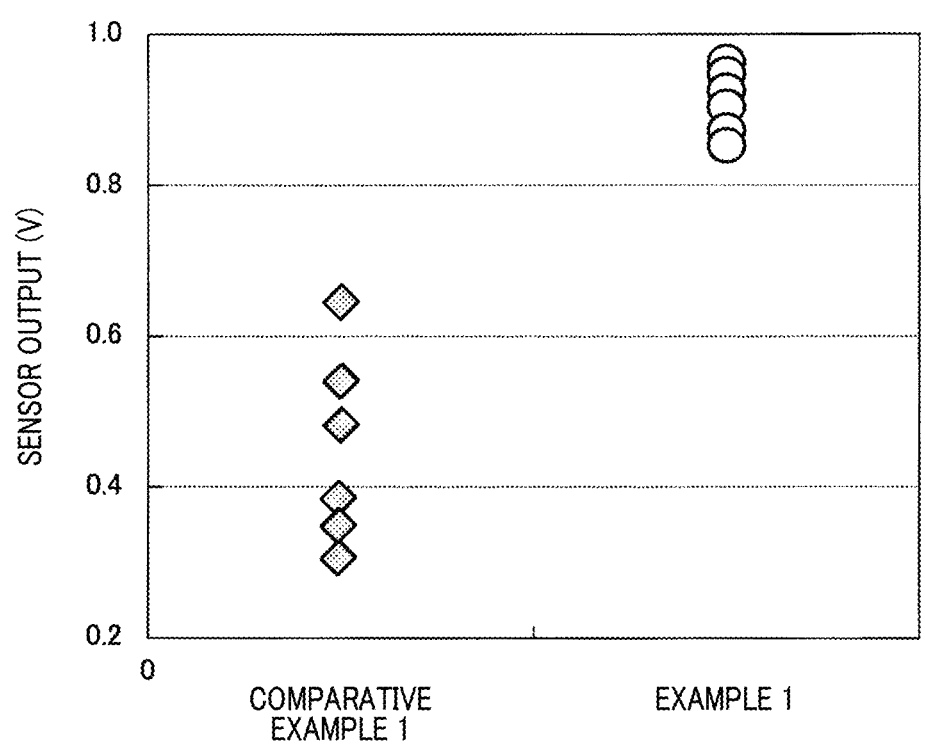
FIG. 12 is a diagram showing variation in the sensor output of the gas sensor elements of Example 1 and Comparative Example 1, according to Experimental Example 3.

As shown in FIG. 12, variation is large between products (i.e., between lots) of the gas sensor elements 8 of Comparative Example 1 not provided with a mixed layer (see FIG. 9). On the other hand, variation in low-temperature sensor output is greatly reduced among the gas sensor elements 1 of Example 1 provided with the mixed layer 5 between the solid electrolyte member 2 and the reference electrode 3 (see FIGS. 1 and 2), as compared with Comparative Example 1. Thus, it is understood that, when the mixed layer 5 is formed between the solid electrolyte member 2 and the reference electrode 3, variation can be reduced in low-temperature performance, such as sensor output.

Comparative Example 2

The present example deals with a gas sensor element having a mixed layer between the solid electrolyte member and the measurement electrode.

Figure 13:
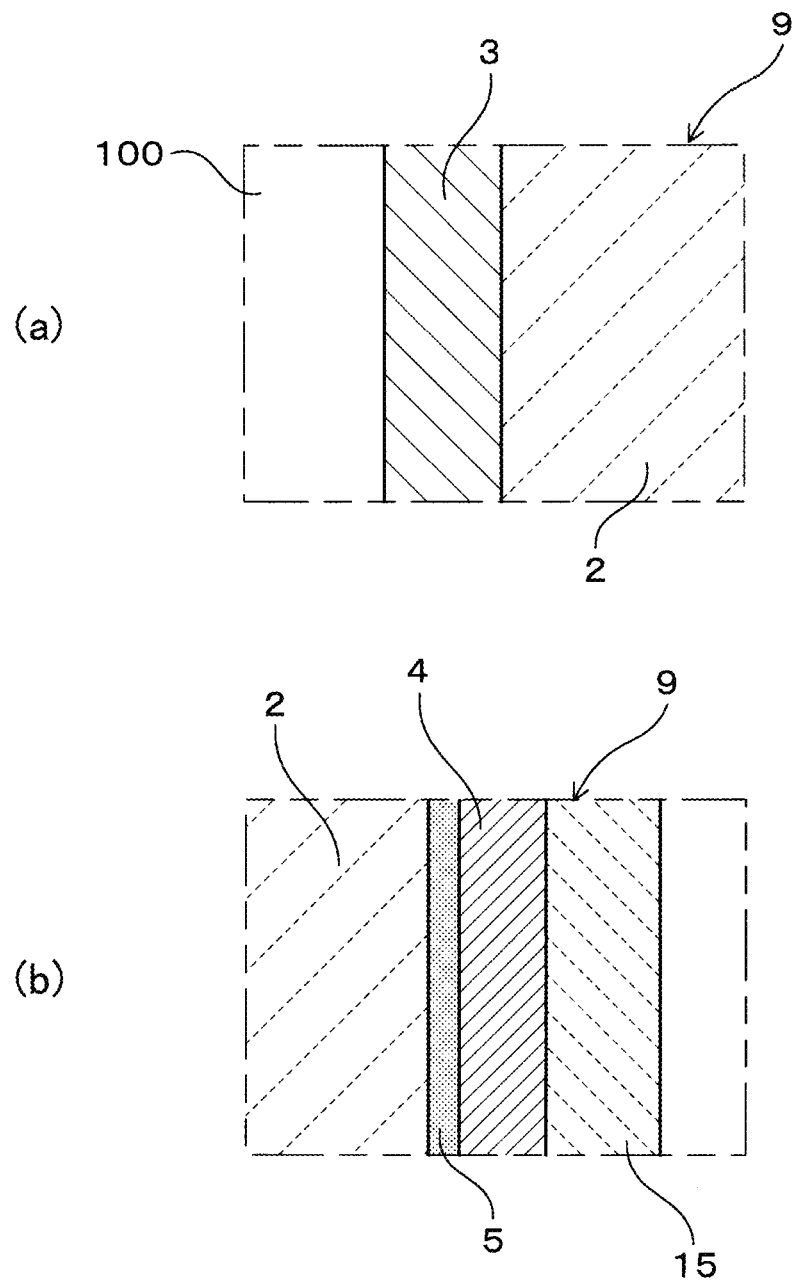
FIG. 13 is a set of enlarged cross-sectional views of a gas sensor element according to Comparative Example 2, in which (a) shows the boundary between the solid electrolyte member and the reference electrode, and (b) shows the boundary between the solid electrolyte member and the measurement electrode.

As shown in FIG. 13(a), the gas sensor element 9 of the present example does not have a mixed layer between the solid electrolyte member 2 and the reference electrode 3, but, as shown in FIG. 13(b), has a mixed layer 5 configured in the same manner as in Example 1 between the solid electrolyte member 2 and the measurement electrode 4. The rest of the configuration is the same as that of Example 1. FIG. 13(a) is an enlarged cross-sectional view corresponding to FIG. 2 of Example 1 described above, and FIG. 13(b) is an enlarged cross-sectional view corresponding to FIG. 3 of Example 1. In the manufacturing method of the gas sensor element 9, a mixed layer was not formed on the inner surface of the solid electrolyte (reference electrode-forming position in the present example). In the method, specifically, the reference electrode was formed by directly applying an active liquid containing dibenzylidene Pt (Pt content was 0.0002 mass % in the present example) onto the solid electrolyte using a dispenser, followed by electroless plating. Further, in the same way as in Example 1, a mixed layer was formed at the measurement electrode-forming part of the outer surface of the solid electrolyte member. The mixed layer 5 between the measurement electrode 4 and the solid electrolyte member 2 can be formed by changing the direction of the DC voltage from that of Example 1. Other than this, the gas sensor element 9 was prepared in the same way as in Example 1.

Experimental Example 4

The present example compares responsiveness to lean gas and rich gas at low temperature, between the gas sensor elements of Example 1, Comparative Example 1, and Comparative Example 2.

Figure 14:
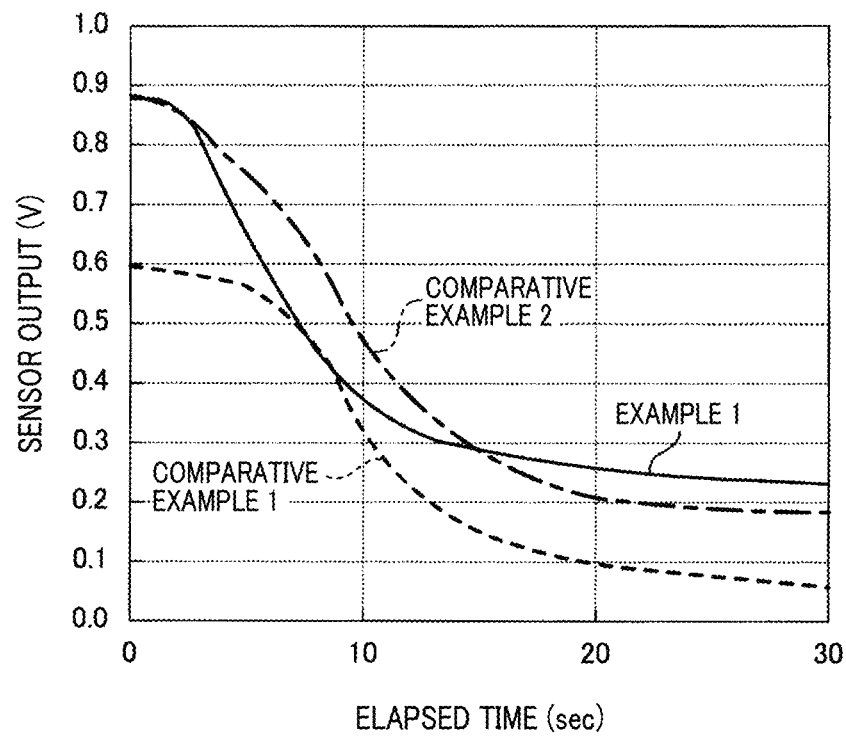
FIG. 14 is a diagram showing change in sensor output over time with respect to lean gas at low temperature, associated with the gas sensor elements of Example 1, Comparative Example 1, and Comparative Example 2, according to Experimental Example 4.

First, the responsiveness to lean gas (response time in the present example) was checked. Specifically, first, using the gas sensor elements 1, 8 and 9 of Example 1, Comparative Example 1 and Comparative Example 2, gas sensors 6 with a configuration similar to that of Example 1 were prepared (see FIG. 8). Then, the surface temperature of each of the gas sensor elements 1, 8 and 9 was controlled to 300° C. by the heater 64 installed in the gas sensor 6. After the temperature became stable, $N_2$ gas (flow rate: 3000 cc/min) and CO gas (flow rate: 60 cc/min) were fed to each gas sensor 6 for 100 seconds until the sensor output became stable. Then, NO gas (flow rate: 120 cc/min) was supplied to the gas sensor. The temperature of the feed gas was 250° C. Then, starting from the start of NO gas feeding, change in sensor output over time was measured. FIG. 14 shows the relationship of elapsed time (sec) from the start of measurement, with sensor output (V). In addition, time taken for the sensor output to decrease by 0.4 V from the start of measurement (i.e., response time to lean gas) was measured. The results are shown in Table 1.

Figure 15:
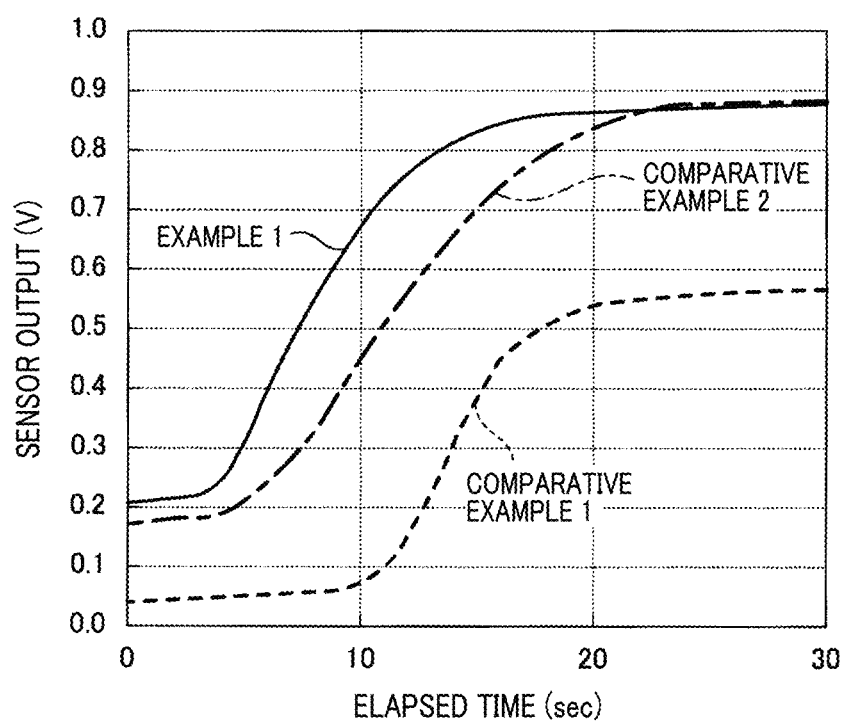
FIG. 15 is a diagram showing change in sensor output over time with respect to rich gas at low temperature, associated with the gas sensor elements of Example 1, Comparative Example 1, and Comparative Example 2, according to Experimental Example 4.

Then, the responsiveness to rich gas (response time in the present example) was checked. Specifically, after measuring the response time to lean gas as described above, $N_2$ gas (flow rate: 3000 cc/min), CO gas (flow rate: 60 cc/min), and NO gas (flow rate: 120 cc/min) were fed to each gas sensor for 100 seconds until the sensor output became stable. The temperature of the feed gas was 250° C. Then, the feeding of NO gas was stopped. Then, starting from the stop of NO gas feeding, change in sensor output over time was measured. FIG. 15 shows the relationship of the elapsed time (sec) from the start of measurement, with the sensor output (V). In addition, time taken for the sensor output to increase by 0.4 V (i.e., response time to rich gas) from the start of measurement was measured. The results are shown in Table 1.

TABLE 1

| Example, Comparative Example No. | Response time to lean gas (sec) | Response time to rich gas (sec) |
| --- | --- | --- |
| Example 1 | 8 | 8 |
| Comparative Example 1 | 13 | 16 |
| Comparative Example 2 | 10 | 12 |

As can be seen from FIGS. 14 and 15, at a low temperature of 300° C., the gas sensor element 8 of Comparative Example 1 having no mixed layer has a small sensor output and its change is also small. Thus, it is understood that a gas sensor element 8 having no mixed layer like Comparative Example 1 is not suitable for use at low temperature. In addition, as can be seen from FIGS. 14 and 15 and Table 1, the gas sensor element 1 of Example 1 provided with the mixed layer 5 between the solid electrolyte member 2 and the reference electrode 3 (see FIGS. 1 and 2) has a shorter response time at a low temperature of 300° C. and shows better responsiveness as compared with the gas sensor element 9 of Comparative Example 2 provided with the mixed layer 5 between the solid electrolyte member 2 and the measurement electrode 4 (see FIG. 13). In particular, responsiveness to rich gas improves in the gas sensor element 1 of Example 1. Thus, it is understood that, when the mixed layer 5 is formed between the solid electrolyte member 2 and the reference electrode 3 as in Example 1, responsiveness at low temperature improves.

Example 2

In Example 1 described earlier, a cup-shaped gas sensor element 1 as shown FIG. 1, for example, was described. However, as shown in FIG. 16, even if the gas sensor element 1 is of a laminated type, advantageous effects similar to those of Example 1 can be achieved by forming a mixed layer (not shown) similar to that of Example 1 between the solid electrolyte member 2 and the reference electrode 3.

Figure 16:
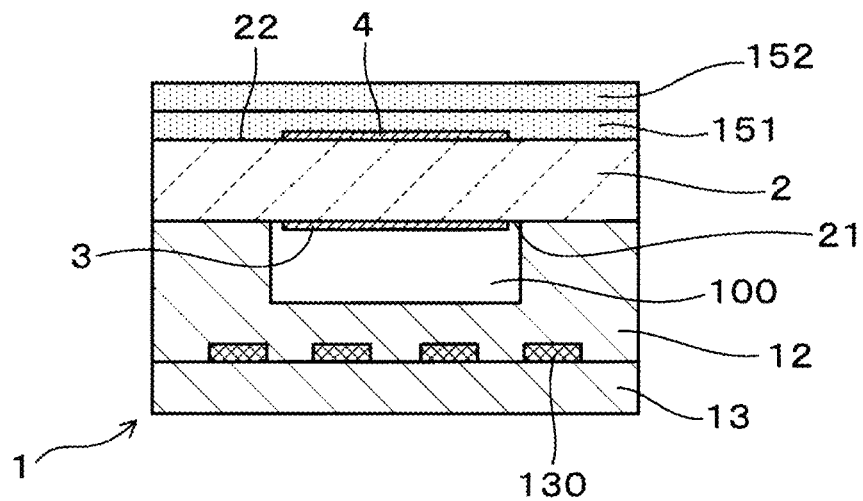
FIG. 16 is a cross-sectional view of a gas sensor element according to Example 2.

As shown in FIG. 16, the gas sensing element 1 of the present example has a reference electrode 3 provided on a surface (referred to as a first surface 21) of a plate-like solid electrolyte member 2, and a measurement electrode 4 provided on the other surface (referred to as a second surface 22). The reference electrode 3 and the measurement electrode 4 are formed at respective face-to-face surfaces 21 and 22 of the solid electrolyte member 2, so that the electrodes 3 and 4 face each other with the solid electrolyte member 2 interposed therebetween. The gas sensing element 1 includes a gas chamber 100 configured by a spacer 12 that has a rear surface which is provided with a heater 13 integrally incorporating heating elements 130 therein. Further, the measurement electrode 4 is covered with a first protective layer 151 and a second protective layer 152 having a two-layer structure. Between the solid electrolyte member 2 and the reference electrode 3, a mixed layer (not shown) in which a noble metal is mixed with an oxygen ion conductive ceramic is formed as in Example 1. No mixed region is formed between the solid electrolyte member 2 and the measurement electrode 4.

Examples of the present invention have been described in detail above. The present invention should not be construed as being limited to the above-described examples, but various modifications may be made within a range not departing from the spirit of the present invention.

REFERENCE SIGNS LIST

1 Gas sensor element
2 Solid electrolyte member
3 Reference gas-side electrode (reference electrode)
4 Measuring gas-side electrode (measurement electrode)
5 Mixed layer
6 Gas sensor

The invention claimed is:

1. A gas sensor element comprising:
a solid electrolyte member including an oxygen ion conductive ZrO2-based ceramic;
a reference gas-side electrode provided on a first surface of the solid electrolyte member and consisting of a noble metal or a noble metal alloy;
a measuring gas-side electrode provided on a second surface of the solid electrolyte member and consisting of a noble metal or a noble metal alloy, the measuring gas-side electrode facing the reference gas-side electrode, with the solid electrolyte member interposed therebetween; and
a mixed layer formed between the solid electrolyte member and the reference gas-side electrode and having an average thickness of 10 to 600 nm, the mixed layer containing a noble metal or a noble metal alloy and a $ZrO_2$-based ceramic mixed with each other, wherein:
any mixed layer containing a noble metal or a noble metal alloy and a $ZrO_2$-based ceramic mixed with each other is not formed between the solid electrolyte member and the measuring gas-side electrode, and the measuring gas-side electrode is directly layered over the surface of the solid electrolyte member,
the mixed layer is in direct contact with the solid electrolyte member and the reference gas-side electrode.

2. A gas sensor wherein the gas sensor comprises a gas sensor element comprising:
a solid electrolyte member including an oxygen ion conductive ZrO2-based ceramic;
a reference gas-side electrode provided on a first surface of the solid electrolyte member and consisting of a noble metal or a noble metal alloy;
a measuring gas-side electrode provided on a second surface of the solid electrolyte member and consisting of a noble metal or a noble metal alloy, the measuring gas-side electrode facing the reference gas-side electrode, with the solid electrolyte member interposed therebetween; and a mixed layer formed between the solid electrolyte member and the reference gas-side electrode and having an average thickness of 10 to 600 nm, the mixed layer containing a noble metal or a noble metal alloy and a ZrO2-based ceramic mixed with each other, wherein any mixed layer containing a noble metal or a noble metal alloy and a $ZrO_2$-based ceramic mixed with each other is not formed between the solid electrolyte member and the measuring gas-side electrode, and the measuring gas-side electrode is directly layered over the surface of the solid electrolyte member, the mixed layer is in direct contact with the solid electrolyte member and the reference gas-side electrode.

* * * * *